United States Patent
Cress

(10) Patent No.: US 11,958,704 B2
(45) Date of Patent: Apr. 16, 2024

(54) METHOD AND DEVICE FOR EFFICIENT MOVING OF PRODUCT DISPLAY ASSEMBLIES

(71) Applicant: Stephen Cress, Catonsville, MD (US)

(72) Inventor: Stephen Cress, Catonsville, MD (US)

(*) Notice: Subject to any disclaimer, the term of this patent is extended or adjusted under 35 U.S.C. 154(b) by 0 days.

(21) Appl. No.: 17/994,778

(22) Filed: Nov. 28, 2022

(65) Prior Publication Data

US 2023/0086498 A1  Mar. 23, 2023

Related U.S. Application Data

(62) Division of application No. 16/509,921, filed on Jul. 12, 2019, now abandoned.

(51) Int. Cl.
*B65G 7/12* (2006.01)
(52) U.S. Cl.
CPC ...................... *B65G 7/12* (2013.01)
(58) Field of Classification Search
CPC .................. B65G 7/12; B65G 7/00
See application file for complete search history.

(56) References Cited

U.S. PATENT DOCUMENTS

| | | | |
|---|---|---|---|
| 5,941,436 A | 8/1999 | Washington et al. | |
| 5,988,476 A | 11/1999 | Olerio | |
| 6,053,383 A | 4/2000 | Gunderson | |
| 6,298,672 B1 * | 10/2001 | Valicoff, Jr. | A47F 3/0443 |
| | | | 62/250 |
| 6,305,559 B1 | 10/2001 | Hardy | |
| 7,690,519 B2 | 4/2010 | Kahl et al. | |
| 2005/0110373 A1 * | 5/2005 | Assmann | A47F 3/04 |
| | | | 312/249.11 |
| 2006/0213150 A1 * | 9/2006 | Sonon | A47F 3/14 |
| | | | 53/467 |
| 2013/0025472 A1 * | 1/2013 | Stanger | F24C 15/16 |
| | | | 99/448 |
| 2015/0326172 A1 | 11/2015 | Koehler | |
| 2020/0223584 A1 * | 7/2020 | Tripp | B65D 19/06 |

FOREIGN PATENT DOCUMENTS

KR  102069110  * 9/2018 ............... A45F 3/14

* cited by examiner

*Primary Examiner* — Derek J Battisti
(74) *Attorney, Agent, or Firm* — Carter, DeLuca & Farrell LLP; Paul J. Natof

(57) ABSTRACT

A device for moving a product display assembly off of a shelf. The device includes a body portion that is configured to slide between the product display assembly and the shelf. The body portion has a thickness of from about 0.10 inches to about 0.30 inches.

19 Claims, 4 Drawing Sheets

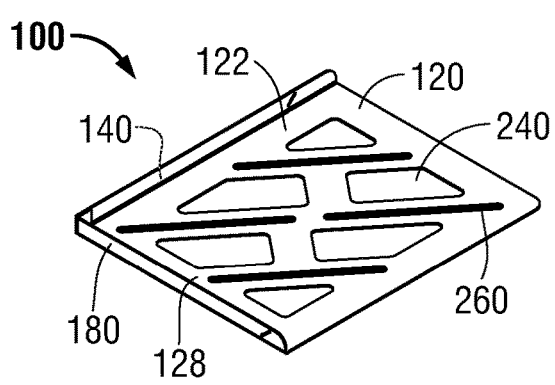
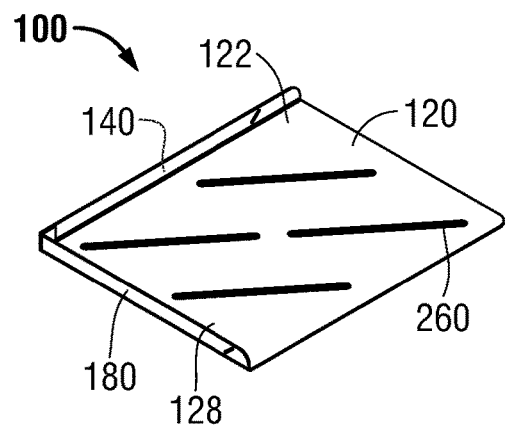
FIG. 1                    FIG. 2
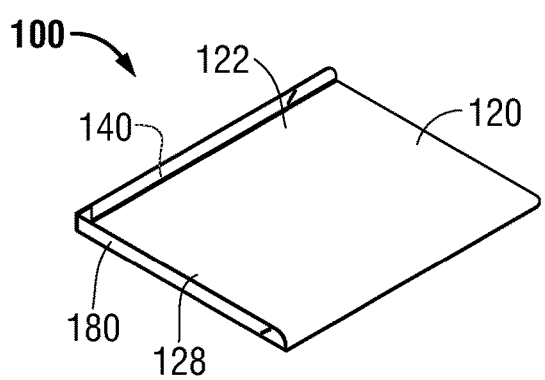
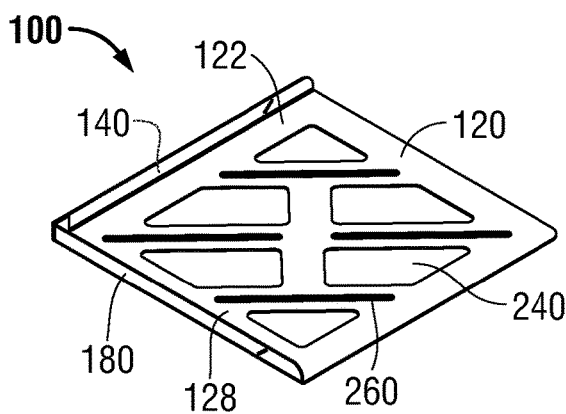
FIG. 3                    FIG. 4
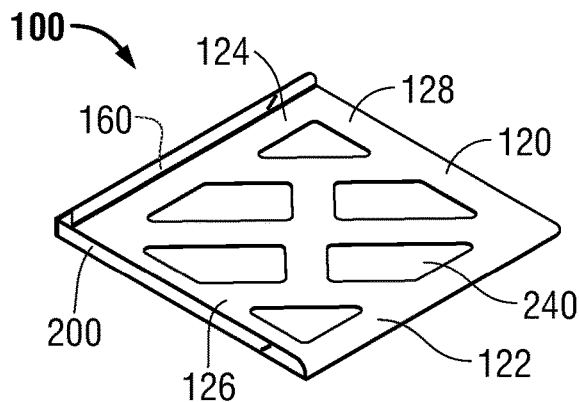
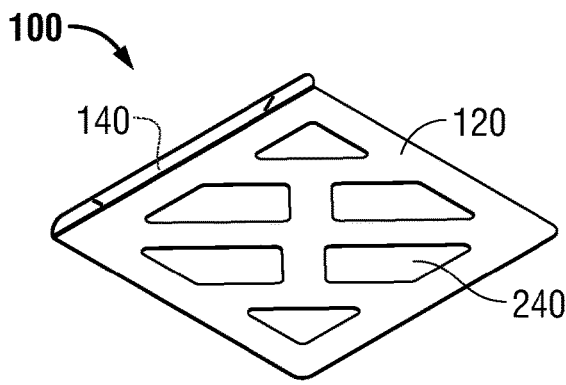
FIG. 5                    FIG. 6

METHOD AND DEVICE FOR EFFICIENT MOVING OF PRODUCT DISPLAY ASSEMBLIES

CROSS-REFERENCE TO RELATED APPLICATION

The present application claims the benefit of, priority to, and is a Divisional application of U.S. patent application Ser. No. 16/509,921 filed on Jul. 12, 2019, the entire content of which being incorporated herein by reference.

BACKGROUND

The present disclosure relates to methods and devices for efficiently moving product display assemblies, and more particularly, to moving product display assemblies without removing products from the product display assemblies.

Various types of product display assemblies and merchandisers are commonly used in retail environments to display different types of products. As opposed to simply positioning products on shelves, product display assemblies or units are commonly used to position products on a shelf in manner which automatically advances (e.g., via gravity or a pusher) a trailing or distal product (i.e., a product that is behind a lead or proximal-most product) closer to a consumer once the lead product has been removed from the shelf. As can be appreciated, such product display assemblies facilitate the arrangement and upkeep of products, as the trailing products do not have to be manually moved toward the front of the shelf, for instance.

Additionally, in retail environments, for example, floor space, shelf space, and space in cold vaults is limited, and retailers typically attempt to maximize the amount of products they can store/display in their retail space. Further, retailers and other users of product display assemblies often change the positioning of the products thereon for various reasons, such as to increase product visibility to help sell more of a particular product.

To change the positioning of the products on product display assemblies, the user (e.g., retailer) typically approaches the shelving unit (from the front or from behind, as in a cold vault), removes many of the products from the product display assemblies, and repositions many of the products onto product display assemblies on different shelves of the shelving unit or a different shelving unit. Additionally, the product display assemblies themselves are commonly repositioned on the shelves as many product display assemblies are sized to display products of a particular size and/or shape.

Accordingly, since many of the products on the product display assemblies (and often the product display assemblies themselves) must be removed to reposition the products, this process typically takes an undesirably long amount of time. Any savings on time and therefore money to complete the task of rearranging products would thus be a welcome change to retailers and other users of product display assemblies.

SUMMARY

The present disclosure relates to a device for moving a product display assembly off of a shelf. The device includes a body portion configured to slide between the product display assembly and the shelf. The body portion has a thickness from about 0.10 inches to about 0.30 inches.

In disclosed embodiments, wherein a proximal end of the body portion has a tapered thickness.

In embodiments, wherein the body portion is made from aluminum or stainless steel.

It is further disclosed that the device includes a lip extending perpendicularly from the body portion. In embodiments, the lip extends from a proximal end of the body portion, a lateral end of the body portion, and/or a distal end of the body portion.

In aspects of the disclosure, the body portion includes a length and/or a width from about 20 inches to about 30 inches.

The present disclosure also relates to a method of removing a product display assembly off of a shelf. The method includes positioning a device under the product display assembly and over the shelf, removing the device from the shelf, and removing the product display assembly from the shelf while removing the device from the shelf.

In disclosed embodiments, at least a majority of a body portion of the device has a thickness from about 0.10 inches to about 0.30 inches. It is also disclosed that the body portion includes a length and/or a width from about 20 inches to about 30 inches. In embodiments, a proximal end of the body portion has a tapered thickness. It is further disclosed that the body portion is made from aluminum or stainless steel.

It is also disclosed that removing the product display assembly from the shelf while removing the device from the shelf includes removing the product display assembly from a distal end of the shelf while removing the device from the distal end of the shelf.

The present disclosure also relates to a product display system including a product display assembly and a device for moving the product display assembly off of a shelf. The product display assembly includes a first mating feature. The device includes a body portion configured to slide between the product display assembly and the shelf, and a second mating feature configured to selectively engage the first mating feature of the product display assembly.

In disclosed embodiments, the first mating feature includes at least one magnet, and the second mating feature includes at least one magnet.

BRIEF DESCRIPTION OF THE DRAWINGS

Embodiments of the present disclosure are described hereinbelow with reference to the drawings wherein:

FIGS. 1-6 are perspective views of various embodiments of a device for moving product display assemblies in accordance with the present disclosure;

DETAILED DESCRIPTION

Figure 7:
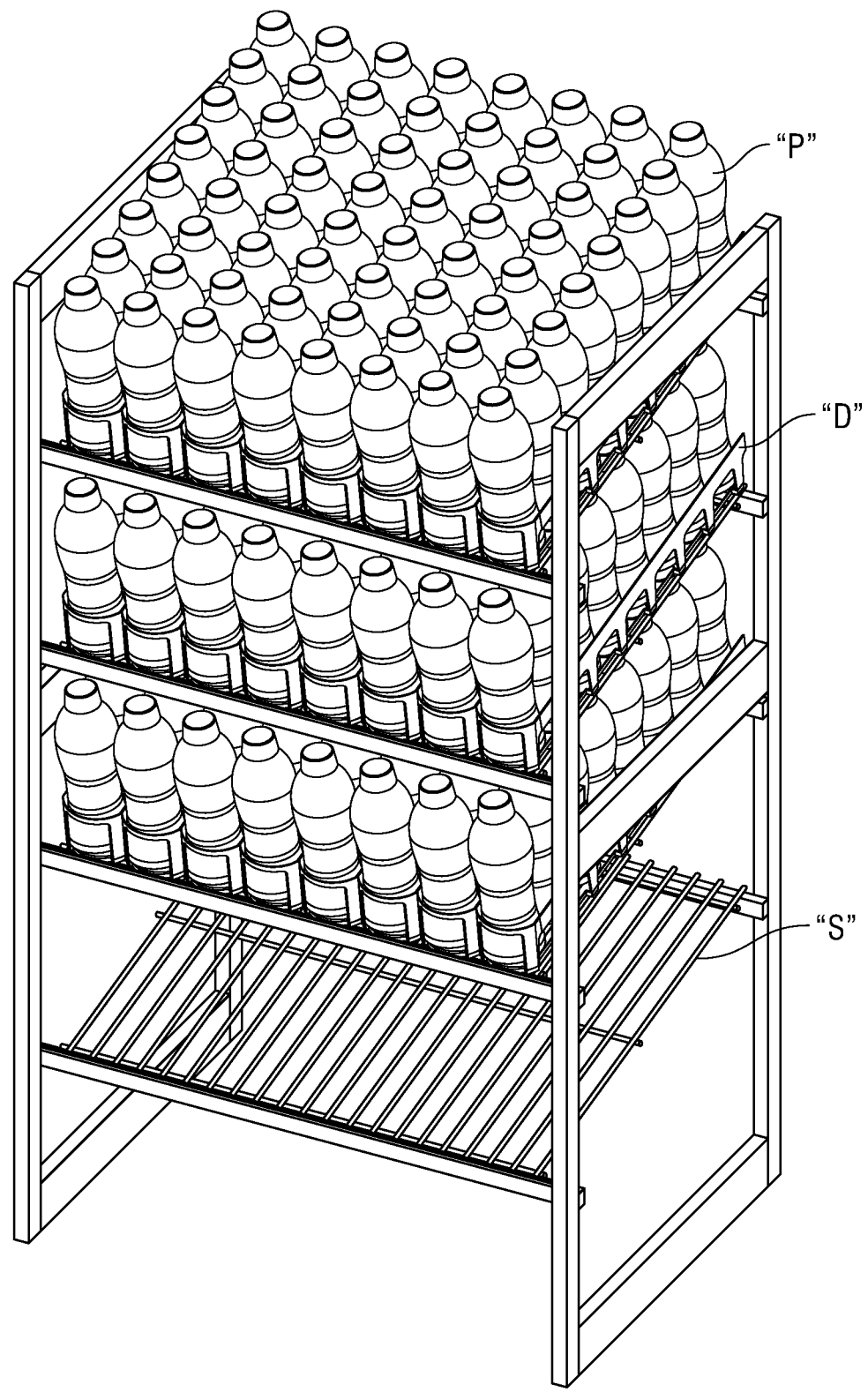
FIG. 7 is a perspective view of several product display assemblies on shelves, and including a plurality of products on each product display assembly.

Embodiments of the presently disclosed devices for moving product display assemblies are now described in detail with reference to the drawings, in which like reference numerals designate identical or corresponding elements in each of the several views. As used herein the term "distal"

refers to that portion of the product display assembly or unit, or component thereof, farther from a user (e.g., customer), while the term "proximal" refers to that portion of the product display assembly or unit, or component thereof, closer to the user. Moreover, the distal portion of the product display assemblies is closest to a cold storage room behind refrigerated shelves, for instance.

Figure 8:
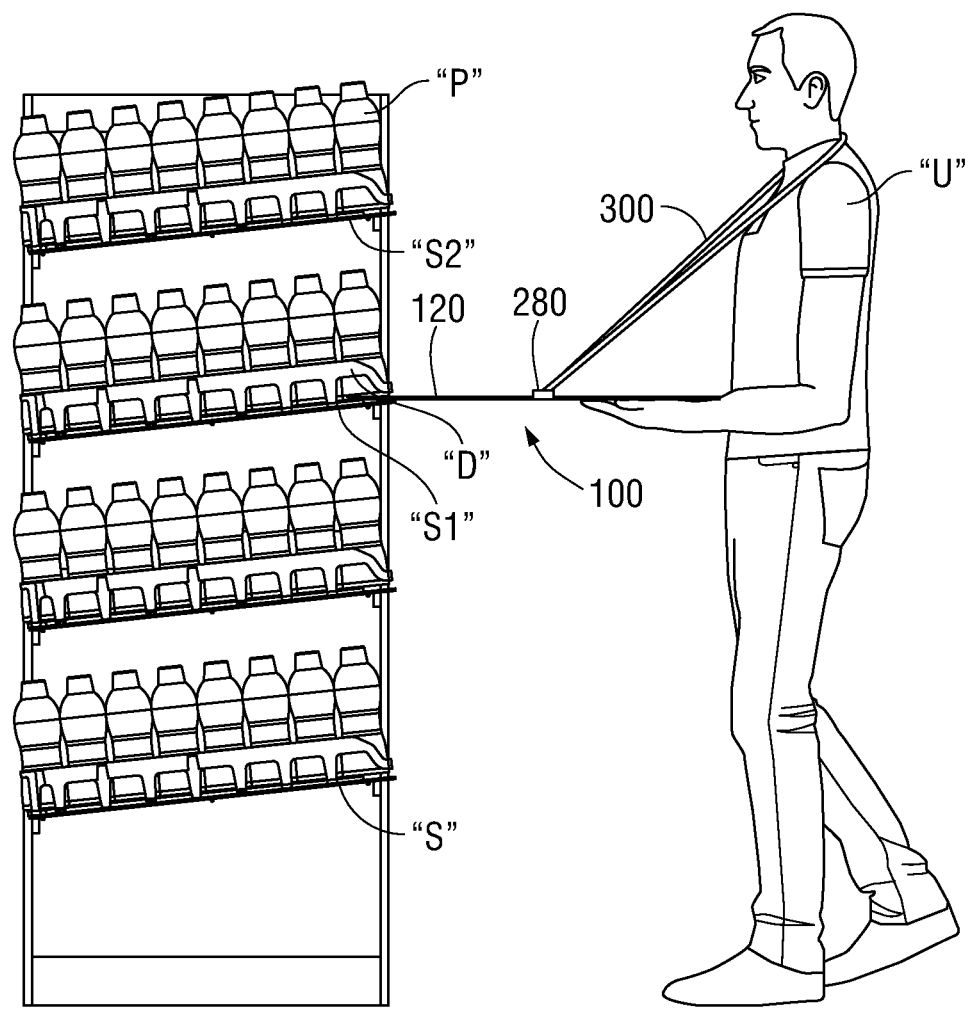
FIG. 8 is a side view a person inserting a device for moving product display assemblies between a product display assembly and a shelf of FIG. 7.
Figure 9:
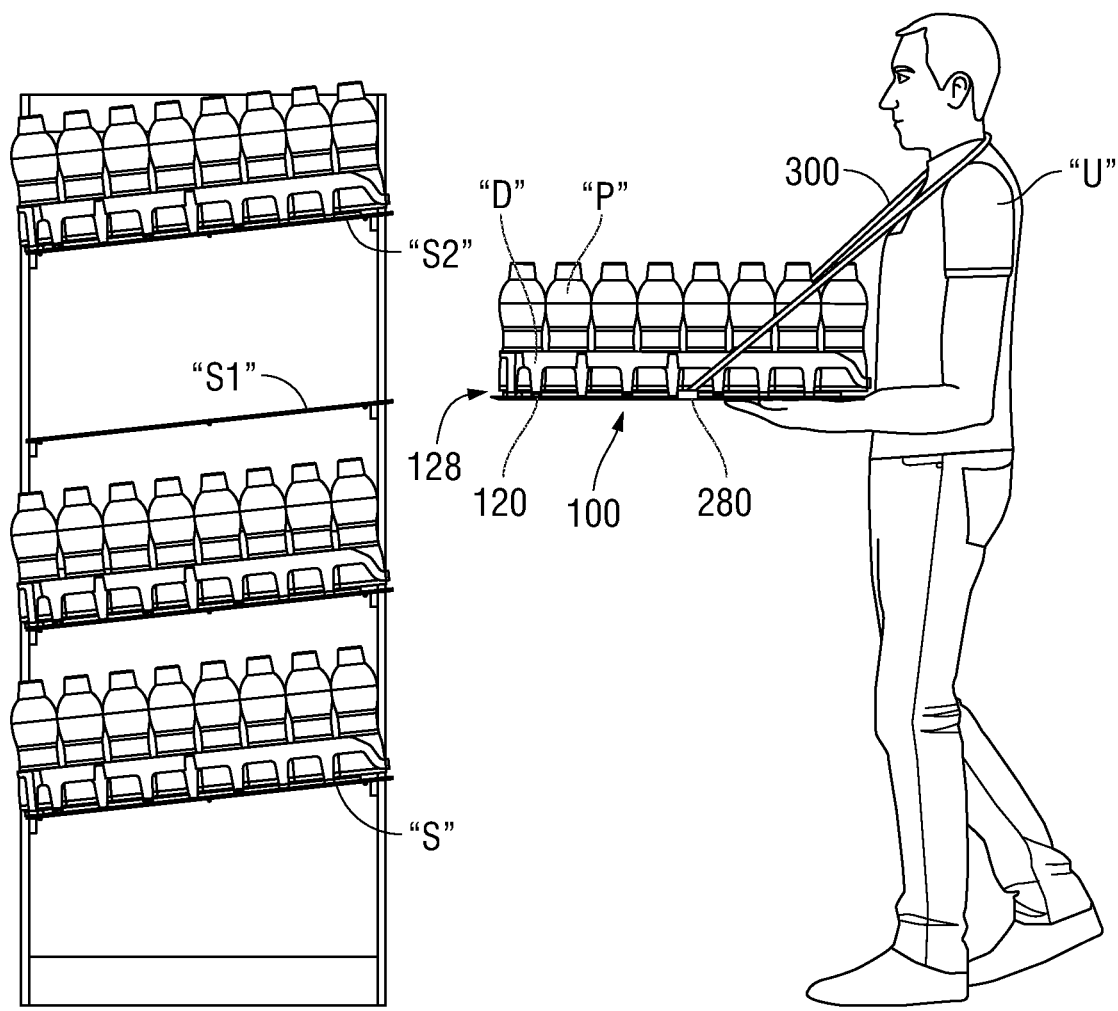
FIG. 9 is a side view of the person of FIG. 8 using the device to hold a product display assembly including products thereon.

Various embodiments of a device for moving product display assemblies are illustrated in FIGS. 1-6 and are each generally referenced by numeral 100, for clarity. Device 100 includes a body portion 120, and optionally includes a first lateral lip 140 (FIGS. 1-4 and 6), a second lateral lip 160 (FIG. 5), a proximal lip 180 (FIGS. 1-4), a distal lip 200 (FIG. 5), hand holds (not explicitly shown), cut outs 240 (FIGS. 1 and 4-6), ribs 260 (FIGS. 1, 2 and 4), strap attachments 280 (FIGS. 8 and 9), and/or a strap 300 (FIGS. 8 and 9).

Body portion 120 of device 100 is sized and dimensioned to slide between a shelf "S" (FIGS. 7-9) and a product display assembly "D" (FIG. 7-9) that is on the shelf "S." More particularly, while body portion 120 may be any suitable thickness, it is envisioned that the thickness "t" of body portion 120 is from about 0.10 inches to about 0.30 inches, and may be equal to about 0.125 inches. Further, is envisioned that the thickness "t" of body portion 120 is either consistent or inconsistent along its length "l" and width "w." For instance, a proximal end 128 of body portion 120 may include a tapered thickness "t" (as shown in FIG. 9), which may facilitate inserting body portion 120 of device 100 between the shelf "S" and the product display assembly "D" thereon. Additionally, while body portion 120 may have any suitable length "l" and width "w" depending on the size of the product display assembly "D" desired to move, it is envisioned that the length "l" of body portion 120 is from about 20 inches to about 30 inches, and it is envisioned that the width "w" of body portion 120 is from about 20 inches to about 30 inches. While specific ranges of dimensions are described herein, devices 10 with body portion 120 having a larger or smaller thickness "t," length "l," and/or width "w" are within the scope of the present disclosure. Further, when the term "about" is used, it is envisioned that the values include +/−10% of the stated value.

With reference to FIGS. 1-6, various optional features of device 100 are shown. Device 100 may include any combination of the following options features; alternatively, device 100 may include none of the following optional features: first lateral lip 140 (FIGS. 1-4 and 6); second lateral lip 160 (FIG. 5); proximal lip 180 (FIGS. 1-4); distal lip 200 (FIG. 5); hand holds (not explicitly shown); cut outs 240 (FIGS. 1 and 4-6); ribs 260 (FIGS. 1, 2 and 4); strap attachments 280 (FIGS. 8 and 9); and/or strap 300 (FIGS. 8 and 9).

First lateral lip 140 is shown in FIGS. 1-4 and 6 and extends upwardly (e.g., perpendicularly or substantially perpendicularly) from body portion 120. First lateral lip 140 is on a first side 122 of body portion 120 and is configured to help maintain a product display assembly "D" on device 100. That is, when body portion 120 of device 100 is inserted between shelf "S" and product display assembly "D," first lateral lip 140 is positioned adjacent or to the side of a first lateral side of product display assembly "D."

Second lateral lip 160 is shown in FIG. 5 and extends upwardly (e.g., perpendicularly or substantially perpendicularly) from body portion 120. Second lateral lip 160 is on a second side 124 of body portion 120 and is configured to help maintain a product display assembly "D" on device 100. That is, when body portion 120 of device 100 is inserted between shelf "S" and product display assembly "D," second lateral lip 160 is positioned adjacent or to the side of a second lateral side of product display assembly "D."

Proximal lip 180 is shown in FIGS. 1-4 and is configured to selectively extend upwardly (e.g., perpendicularly or substantially perpendicularly) from body portion 120. Proximal lip 180 is configured to engage proximal end 128 of body portion 120 (i.e., farthest from the user "U" of device 100, as shown in FIGS. 8 and 9), and is configured to help maintain a product display assembly "D" on device 100. Moreover, after body portion 120 of device 100 is inserted between shelf "S" and product display assembly "D," proximal lip 180 is then positioned adjacent or in front of a proximal wall (or another proximal feature) of product display assembly "D." More particularly, proximal lip 180 is selectively positioned to extend upward from proximal end 128 of body portion 120 after body portion 120 of device 100 is inserted between shelf "S" and product display assembly "D." Several methods of positioning proximal lip 180 on proximal end 128 of body portion 120 are disclosed, including: proximal lip 180 having legs that are insertable (e.g., by a second person) into openings/grooves of proximal end of 128 of body portion 120; or device 100 includes an actuator, handle or trigger (not explicitly shown) that is actuated, squeezed or depressed to cause proximal lip 180 to move from a retracted position (e.g., below body portion 120) to an advanced position (e.g., extending upward from proximal end 128 of body portion 120 (e.g., using cables, pulleys, springs, etc.)).

Distal lip 200 is shown in FIG. 5 and extends upwardly (e.g., perpendicularly or substantially perpendicularly) from body portion 120. Distal lip 200 is on a distal end 126 of body portion 120 (i.e., closest to the user "U" of device 100, as shown in FIGS. 8 and 9), and is configured to help maintain a product display assembly "D" on device 100. That is, when body portion 120 of device 100 is inserted between shelf "S" and product display assembly "D," distal lip 200 is positioned adjacent or behind a distal wall of product display assembly "D."

It is envisioned that first lateral lip 140, second lateral lip 160, proximal lip 180 and/or distal lip 200 each has a height from about 0.25 inches to about 2.0 inches, and may equal about 1.5 inches. Further, in embodiments when device 100 includes more than one of first lateral lip 140, second lateral lip 160, proximal lip 180 and/or distal lip 200, each of these lips may have the same or different height from each other. Additionally, first lateral lip 140, second lateral lip 160, proximal lip 180 and/or distal lip 200 may extend entirely along or partially along their respective portions of body portion 120. In embodiments, at least one of first lateral lip 140, second lateral lip 160, proximal lip 180 and distal lip 200 is selectively or removably engaged with body portion 120, e.g., via mechanical structure and/or magnets.

Hand holds may be included to enable a user "U" to better grasp, hold, position or lift device 100. Hand holds may be in the form of cut-outs at least partially through body portion 120 of device 100 and/or handles that extend upwardly from body portion 10 (e.g., adjacent at least one lateral side 122, 124 of body portion 120, and/or adjacent distal end 126 of body portion 120). Additionally, device 100 may include multiple sets of hand holds to facilitate more than one person to lift device 100 at once.

Cut outs 240 are shown in FIGS. 1 and 4-6 and are configured to reduce the weight of device 100, for example. While cut outs 240 are shown in various sizes, shapes, locations and configurations, other sizes, shapes, locations and configurations of cut outs 240 are within the scope of the present disclosure.

Ribs 260 are shown in FIGS. 1, 2 and 4 and are configured to help increase the strength of device 100, for example. While ribs 260 are shown in various sizes, shapes, locations and configurations, other sizes, shapes, locations and configurations of ribs 260 are within the scope of the present disclosure. Additionally, at least some ribs 260 may be recessed and/or include a non-skid material therein, such that an upper surface of the non-skid material is flush or substantially flush with an upper surface of body portion 120. This arrangement may be helpful to mitigate slippage between device 100 and a product display assembly "D" when using device 100 to remove the product display assembly "D" from a shelf "S."

Strap attachments 280 and strap 300 are shown in FIGS. 8 and 9. Strap 300 may be secured to device 100 via strap attachments 280, and may help distribute the weight of device 100, product display assembly "D," and products "P" to facilitate the lifting and moving thereof by a user "U." While strap attachments 280 and strap 300 are shown in various sizes, shapes, locations and configurations, other sizes, shapes, locations and configurations of strap attachments 280 and strap 300 are within the scope of the present disclosure.

Body portion 120 of device 100 may be made from any suitable material, such as aluminum, stainless steel, or plastic (e.g., when made via injection molding). Additionally, at least part of an upper surface of body portion 120 may include a non-skid surface.

Additionally, in embodiments of device 100 including a distal lip 200, distal lip 200 may be made from a magnetic material and/or may have a magnet (including at least one magnet strip, for instance) disposed on a proximal-facing surface thereof. When device 100 is inserted between the shelf "S" and the product display assembly "D" on the shelf "S," the magnet would engage a corresponding magnet (including at least one magnet strip, for instance) disposed on a distal portion of the product display assembly "D." The engagement between these two magnets would help maintain contact between device 100 and the product display assembly "D" to thereby facilitate the lifting and/or moving of the product display assembly "D" (e.g., with products "P" thereon) on device 100. Other mating mechanical structures are contemplated to help maintain contact between device 100 and the product display assembly "D," such as a lip/recess, hook/eye, hook and loop fasteners, etc.

Moreover, the present disclosure also relates to a system including a device 100, and a product display assembly "D" that is matable or engageable with the device 100, such as by magnetic means or other mechanical structures as noted above.

Now referring to FIGS. 8 and 9, the present disclosure also includes a method of moving product display assemblies "D" (e.g., with products "P" thereon) from one shelf (e.g., "S1" in FIGS. 8 and 9) to another shelf (e.g., "S2" in FIGS. 8 and 9). The method includes inserting device 100 between the shelf "S" and the product display assembly "D." More particularly, the method includes inserting device 100 above the shelf "S" and below the product display assembly "D." When being used from behind the shelf "S," the device 100 is pushed proximally (i.e., toward the portion of the product display assembly "D" facing a customer) until proximal end 128 of body portion 120 of device 100 is adjacent or proximally beyond a proximal end of the product display assembly "D."

Next, optionally, proximal lip 180 is engaged with proximal end 128 of body portion 120 of device 100 proximally of product display assembly "D" (which may be accomplished by a separate user), or proximal lip 180 is moved into place such that proximal lip 180 extends upward from proximal end 128 of body portion 120 of device 100 proximally of product display assembly "D."

Here, device 100 and the product display assembly "D" (e.g., with products "P" thereon) are moved (e.g., slid) generally distally relative to the shelf "S" until an entirety of device 100 is moved distally beyond the shelf "S" (e.g., "S1"). Device 100 with the product display assembly "D" thereon is then either temporarily placed out of the way, or repositioned on another shelf "S" (e.g., "S2", after the product display assembly "D" on "S2" has been removed). To reposition the product display assembly "D" on another shelf "S," the user simply positions device 100 including the product display assembly "D" (possibly including products "P" thereon) onto the other shelf "S." Next, the user slides device 100 distally, between the shelf "S" and the product display assembly "D," relative to both the shelf "S" and the product display assembly "D," such that empty device 100 is moved distally of the shelf "S" and the product display assembly "D."

As can be appreciated, when device 100 is being used to move the product display assembly "D" off of the front of the shelf "S," the same process is utilized but from the opposite direction.

Accordingly, device 100 of the present disclosure allows for efficient loading and rearranging of many products "P" on different product display assemblies "D" on a plurality of shelves "S." That is, device 100 reduces or eliminates the need to remove products "P" from product display assemblies "D" when the rearranging of products "P" on shelves "S" is desired.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended hereto.

The invention claimed is:

1. A method of removing a product display assembly from a shelf, the method comprising: positioning a hand-held device under the product display assembly and over the shelf such that a lower surface of the hand-held device contacts the shelf, and an upper surface of the hand-held device contacts the product display assembly; removing the hand-held device from contact with the shelf; moving the product display assembly relative to the shelf, wherein the upper surface of the hand-held device remains in contact with the product display assembly while the hand-held device is removed from contact with the shelf; and further including holding the hand-held device in at least one hand, and lifting the hand-held device while holding the hand-held device.

2. The method according to claim 1, wherein at least a majority of a body portion of the hand-held device has a thickness from about 0.10 inches to about 0.30 inches.

3. The method according to claim 2, wherein the body portion includes a length from about 20 inches to about 30 inches.

4. The method according to claim 3, wherein the body portion includes a width from about 20 inches to about 30 inches.

5. The method according to claim 2, wherein a proximal end of the body portion has a tapered thickness.

6. The method according to claim 2, wherein the body portion is made from aluminum or stainless steel.

7. The method according to claim 2, wherein moving the product display assembly relative to the shelf includes removing the product display assembly from a distal end of the shelf, and wherein the shelf is angled such that the distal end of the shelf is higher than a proximal end of the shelf.

8. The method according to claim 1, wherein the upper surface of the hand-held device is planar.

9. The method according to claim 8, wherein the lower surface of the hand-held device is planar.

10. The method according to claim 1, wherein positioning the hand-held device under the product display assembly and over the shelf includes positioning hands of a user on the hand-held device.

11. The method according to claim 10, wherein removing the hand-held device from contact with the shelf includes positioning the hands of a user on the hand-held device.

12. The method according to claim 1, wherein the product display assembly is configured to hold a plurality of products.

13. The method according to claim 1, wherein the product display assembly is configured to hold a plurality of beverage containers.

14. The method according to claim 1, further including engaging a first mating feature of the product display assembly with a second mating feature of the hand-held device.

15. The method according to claim 14, wherein the first mating feature includes a first magnet, and the second mating feature includes a second magnet.

16. The method according to claim 1, wherein the hand-held device has a width that is at least equal to a width of the product display assembly to be removed from the shelf.

17. The method according to claim 1, wherein during each of the positioning step, the removing step and the moving step, the hand-held device is solely supported by a user.

18. The method according to claim 1, further including engaging a strap with a first lateral side of the hand-held device and with a second lateral side of the hand-held device, and positioning the strap around a neck of a user to help support the hand-held device.

19. The method according to claim 18, wherein the engaging step is performed without any portion of the hand-held device contacting a floor.

* * * * *